Sept. 16, 1958   H. SCHNELL ET AL   2,851,734
PROCESS FOR PREPARING DENTURES PROVIDED WITH SOFT LININGS
Filed July 3, 1951

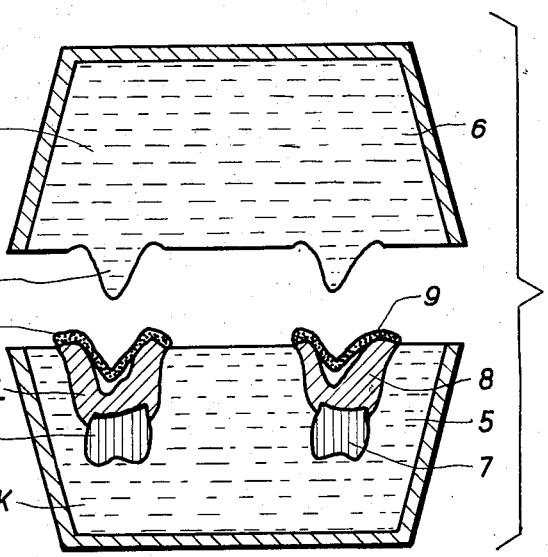

Fig. 1

UPPER HALF OF FLASK
MODEL OF LOWER JAW
SOFT DENTAL LINING SHEET
UNCURED HARD DENTAL MATERIAL
TOOTH
LOWER FLASK

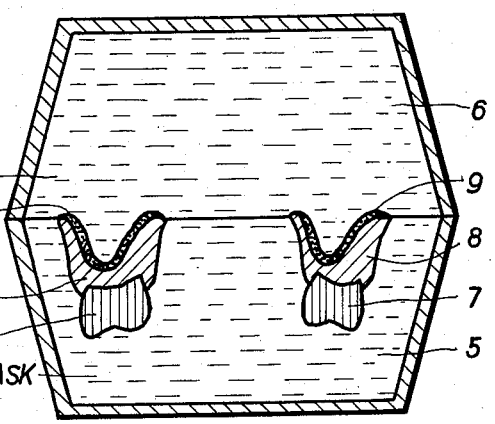

Fig. 2

UPPER HALF OF FLASK
SOFT DENTURE LINING
UNCURED HARD DENTURE MATERIAL
TOOTH
LOWER FLASK

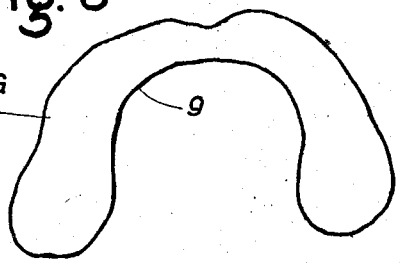

Fig. 3

SOFT LINING MATERIAL

Fig. 4

TOOTH
HARD DENTURE MATERIAL
SOFT LINING

INVENTORS:
HERMANN SCHNELL, WILHELM BECKER
BY
ATTORNEYS

United States Patent Office 2,851,734
Patented Sept. 16, 1958

2,851,734

PROCESS FOR PREPARING DENTURES PROVIDED WITH SOFT LININGS

Hermann Schnell and Wilhelm Becker, Leverkusen, Germany, assignors to Farbenfabriken Bayer Aktiengesellschaft, Leverkusen, Germany, a corporation of Germany Application July 3, 1951, Serial No. 235,096

Claims priority, application Germany July 6, 1950

2 Claims. (Cl. 18—55.1)

This invention relates to a process for preparing dentures provided with soft linings.

Artificial dentures prepared from methacrylic acid methyl ester show the advantage of physiological and chemical indifference as well as good tensile strength. According to a known process these dentures may be prepared according to the following method. Monomeric, liquid, polymerizable methacrylic acid derivatives, for instance, methacrylic acid methyl ester and any polymers, such as polymeric methacrylic acid methyl ester, and suitable catalysts, for instance, organic peroxides, are packed into a customary denture mold and hardened therein by polymerization, if necessary, with heating. The polymers may be employed in this process in solid, comminuted form so that by mixing the monomeric polymeric compounds a plastic, doughy mass is obtained, or the polymeric components may be dissolved in the monomeric liquid compound. It is of advantage to provide that surface of the denture which is permanently in contact with the tissues of the mouth, with a lining of a soft material which due to its resilience does not irritate the tissues of the mouth. Furthermore, such lining gives the denture an accurate fit in the mouth thus preventing the entering of foodstuffs between the denture and the tissue and improves the adhesion of the denture to the tissue.

In accordance with the present invention it has been found that dentures provided with a soft lining may be prepared in a single operation step by placing an appropriately shaped sheet or foil of a soft, resilient plastic that may be slightly cross-linked, over the above-defined mixture containing monomers and polymers, after this mixture has been packed into the mold, and polymerizing said mixture while in contact with said sheet or foil. Thereby a denture is formed which is provided on the tissue side with a strongly adherent, soft plastic the thickness of which approximately corresponds to the thickness of the sheet or foil and the surface of which conforms to the shape of the mold. Suitable plastics within the scope of the invention are those which while being slightly hard and possessing resilient molding properties show a plastic deformation as small as possible, provide a strong adhesion between the polymerizate formed in the mold and the soft plastic at the temperatures usually applied in the preparation of artificial dentures, and accurately take the shape of the mold on molding even in the absence of a plasticizer. Especially suitable plastics in the preparation of the sheets and foils are copolymerizates of lower methacrylic acid esters, such as methacrylic acid methyl ester, methacrylic acid ethyl ester, methacrylic acid isopentyl ester, and another or several other vinyl components which when polymerized by themselves yield soft plastics, such as acrylic acid butyl ester, acrylic acid hexyl ester, acrylic acid octyl ester, methacrylic acid octyl ester, methacrylic acid-n-lauryl ester. The properties of these copolymerizates are influenced by the polymerization conditions applied as well as by the quantitative proportions of the monomeric components during copolymerization.

Plastics with especially useful properties as to resilience and plasticity are obtained by carrying through the polymerization in the presence of polyfunctional vinyl compounds, for instance, divinyl benzene, glycol dimethacrylate, glycol diacrylate, butanediol dimethacrylate, hexanediol dimethacrylate, cross-linked polymerizates being obtained thereby. As a matter of fact, cross-linking may also be effected after polymerization by a secondary reaction.

For instance, a copolymerizate of a 35:65 methacrylic acid methyl ester/acrylic acid butyl ester composition, prepared by pearl polymerization at 80° C. in the presence of benzoyl peroxide as accelerator, yields sheets or foils by molding at 150° C. These sheets or foils measured at 37° C. show the following properties:

Shore hardness_____ 25
Tensile strength_____kg./cm.$^2$__ 21
Elongation at break_____percent__ 500
Plastic deformation (after 1 hour) _____percent___ 3

The tensile strength of the sheets is increased and the plastic deformation is decreased by cross-linking. For instance, a copolymerizate of a 35:64:1 methacrylic acid methyl ester/acrylic acid butyl ester/glycol dimethacrylate obtained as described above gives rise to sheets with the following properties:

Tensile strength_____kg./cm.$^2$__ 23
Elongation at break_____percent__ 615
Shore hardness_____ 30
Plastic deformation after 1 minute_____percent__ 6
After 1 hour_____percent__ 1

The above plastic materials may be used for preparing dentures consisting of two strongly adherent layers. Due to the slight plastic deformation of the material the rim of the denture has not to be made of hard material. The soft plastic can be trimmed with metal-cutting tools.

In the drawings Fig. 1 is a schematic view of a step of the process showing portions of the apparatus and materials in section.

Fig. 2 is a schematic view of a step subsequent to that shown in Fig. 1.

Fig. 3 is a plan view of a sheet employed in the process.

Fig. 4 is a sectional view of the improved denture of the present invention.

Referring in detail to the drawing, and particularly to Fig. 4, the improved denture includes a tooth 7 imbedded in a hard denture body 8. Particular attention is directed to a soft resilient member 9 in the gum engaging portions of the denture, which soft resilient member 9 is bonded so securely to the body 8 as to substantially eliminate lamination difficulties. This highly desirable product is formed by a process employing a sheet of soft resilient material which may be cut to a suitable pattern, such as shown in Fig. 3. This sheet of soft plastic is positioned in the gum engaging portions of the denture mold, and pressed by hand into partial conformance with the mold, as indicated schematically in Fig. 1. The denture mold comprises a lower member 5, in which the teeth 7 and the dough for making the body 8 are positioned. When the upper member 6 of the denture mold is placed against the sheet 9, the soft sheet conforms more exactly to the gum engaging shape, and is also placed firmly against the dough 8. Thus, when the entire mold is subjected to curing conditions, the dough not only hardens, but also bonds securely to the soft resilient sheet 9.

The invention is further illustrated by the following examples without being restricted thereto.

*Example 1*

For preparing a supra-maxillary denture provided with a soft, resilient lining a dental mold is packed with a plastic mixture containing monomeric and polymeric methacrylic acid methyl ester as described in British specification No. 484,343 and closed. After opening the mold the excess plastic is removed and an appropriately cut piece of a 0.3 mm. thick foil of a copolymerizate prepared from 35 parts by weight of methacrylic acid methyl ester and 65 parts by weight of acrylic acid butyl ester is placed over the above mixture in the mold so as to completely cover the said mixture. Molding is done as usual and polymerization is effected by immersing the mold into boiling water. After removal from the mold a denture of two layers is obtained. The tissue side of the denture is coated with the soft, resilient copolymerizate the thickness of which approximately corresponds to the inserted foil and the contour exactly fits the plastic mold.

The laminated denture obtained as described above can be trimmed on the soft lining with a sharp milling machine. The finished denture is a stable product and comfortable to wear while avoiding any pressure to the mouth and providing an accurate fit; the adhesion to the mouth tissue is substantially improved.

*Example 2*

A supra-maxillary denture with a soft sucking rim on the tissue side is prepared as described in Example 1 by cutting a stripe of about 1 cm. width from the 0.3 mm. thick plate of soft, resilient copolymerizate so as to conform to the shape of the denture rim and placed over the mixture packed into the mold.

A denture is thus obtained the rim of which consists of a soft, resilient material and the palatal part of a hard plastic, whereby an especially good adhesion is attained.

*Example 3*

According to the process described in Example 1 a sub-maxillary denture with a soft, resilient lining is obtained as follows:

A foil cut from a 1 mm. thick plate of a cross-linked copolymerizate prepared from 35 parts by weight of methacrylic acid methyl ester, 64 parts by weight of acrylic acid butyl ester and 1 part by weight of glycol dimethyl acrylate is placed over the copolymerizable mixture described in Example 1, which is packed into a denture mold, pressed as usual and polymerized. A denture consisting of two layers is thus obtained which is distinguished by a high resilience and a slight plastic deformation of the soft lining even at places subjected to higher pressure, for instance, sharp maxillary ridges and projecting margins of bones, whereby displacing of the denture is avoided.

*Example 4*

For preparing a supra-maxillary denture with a soft, resilient lining, a dental mold prepared as usual is packed with a material obtained by kneading together 2 parts by weight of after-chlorinated and densified polyvinyl chloride, 1 part by weight of a methacrylic acid methyl ester pearl polymerizate with the addition of 0.15% cadmium red, 0.15% titanium dioxide and 0.5% benzoyl peroxide, and monomeric methacrylic acid ester, in a proportion of 3 parts of powder to 1 part of liquid (cf. copending application Ser. No. 220,330, filed April 10, 1951, now abandoned).

After preliminary pressing the excess material is removed and a piece of a 0.3 mm. thick foil of a copolymerizate prepared from 35 parts by weight of methacrylic acid methyl ester and 65 parts by weight of acrylic acid butyl ester, which completely covers the denture, is placed over the mixture and pressed again. Further processing is done as usual. A denture is thus obtained which combines the advantages of the soft lining described in Example 1 with an essentially increased tensile strength of the denture.

We claim:

1. The method of making dentures which comprises preparing a thin sheet of soft resilient copolymerizate containing no plasticizer and formed by polymerizing a mixture of approximately 35% methyl methacrylate and approximately 65% butyl acrylate; placing said sheet in contact with a dough of polymeric unsaturated ester dispersed in monomeric unsaturated ester in gum-engaging position in a denture mold; subjecting the mold to heat whereby the unsaturated monomer and polymer becomes a strong, hard denture body and whereby the resilient sheet of unsaturated ester copolymerizate becomes firmly bonded thereto.

2. The method of claim 1 in which the resilient sheet is copolymerized from a mixture containing a minor amount of crosslinking component.

References Cited in the file of this patent

UNITED STATES PATENTS 2,551,812    Nelson _____ May 8, 1951

FOREIGN PATENTS 484,343    Great Britain _____ May 4, 1938